No. 823,247. PATENTED JUNE 12, 1906.
A. WOOD.
COMPOSITE SPEED CHANGER.
APPLICATION FILED JAN. 31, 1906.
3 SHEETS—SHEET 1.
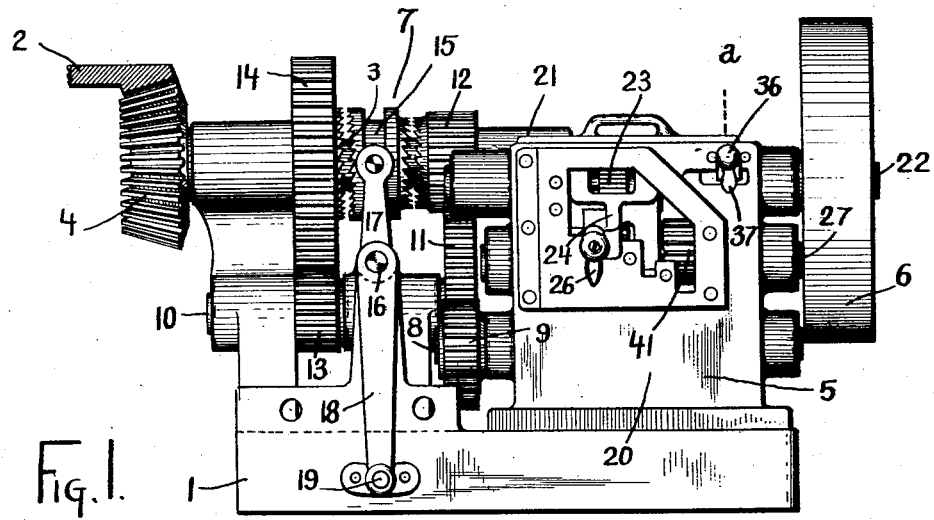
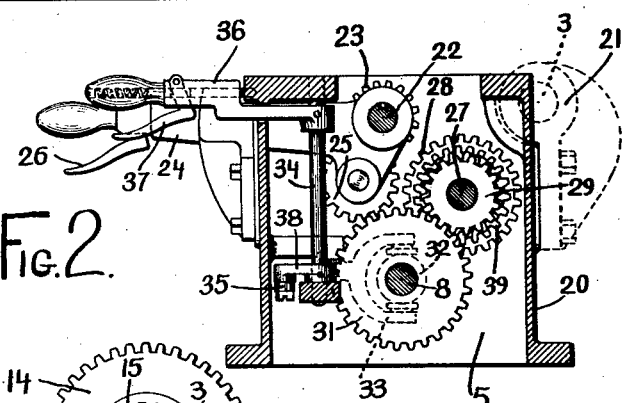
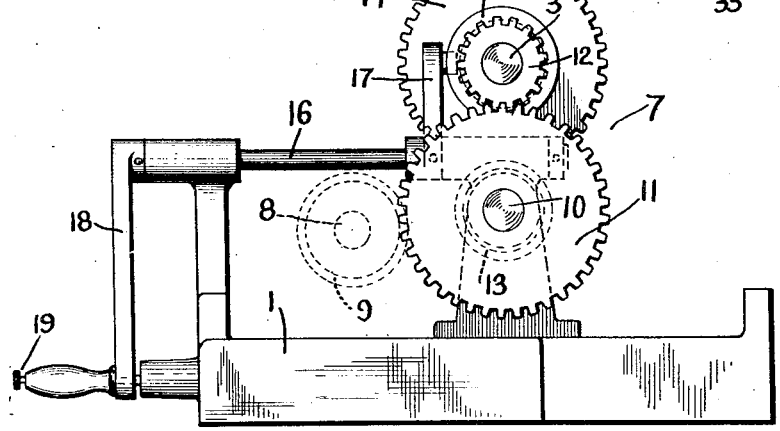
Witnesses:
Elmer R. Shipley.
M. S. Belden.
Augustus Wood, Inventor
by James W. See
Attorney No. 823,247. PATENTED JUNE 12, 1906.
A. WOOD.
COMPOSITE SPEED CHANGER.
APPLICATION FILED JAN. 31, 1906.

3 SHEETS—SHEET 3.

Witnesses:
Elmer R. Shipley.
M. S. Belden.

Augustus Wood
Inventor
by James W. See
Attorney

UNITED STATES PATENT OFFICE.

AUGUSTUS WOOD, OF HAMILTON, OHIO, ASSIGNOR TO NILES-BEMENT-POND COMPANY, OF JERSEY CITY, NEW JERSEY.

COMPOSITE SPEED-CHANGER.

No. 823,247.  Specification of Letters Patent.  Patented June 12, 1906.

Application filed January 31, 1906. Serial No. 298,768.

*To all whom it may concern:*

Be it known that I, AUGUSTUS WOOD, a citizen of the United States, residing at Hamilton, Butler county, Ohio, (whose post-office address is care Niles Tool Works Company, Hamilton, Ohio,) have invented certain new and useful Improvements in Composite Speed-Changers, of which the following is a specification.

In the manufacture of an extended line of machinery numerous cases arise in which a speed-changing device is desired which will be of some general applicability throughout the class of diversified machines.

My invention comprehends such a speed-changing device.

Again, within such general class of diversified machines cases arise in which some particular subclass of the machines involves a variety of sizes or other varying conditions such that the speed-changer above referred to would not be universally applicable to the subclass.

To provide for such cases, my invention contemplates the employment of the regular speed-changer above referred to and the addition of a secondary speed-changer of specifically suitable character to serve as a modifier of the speeds derived from the main speed-changer, the primary and the secondary speed-changers working together and providing for a diversity of constructive conditions, while the primary speed-changer is adapted for a general variety of conditions.

My invention will be readily understood from the following description, taken in connection with the accompanying drawings, in which—

Figure 4:
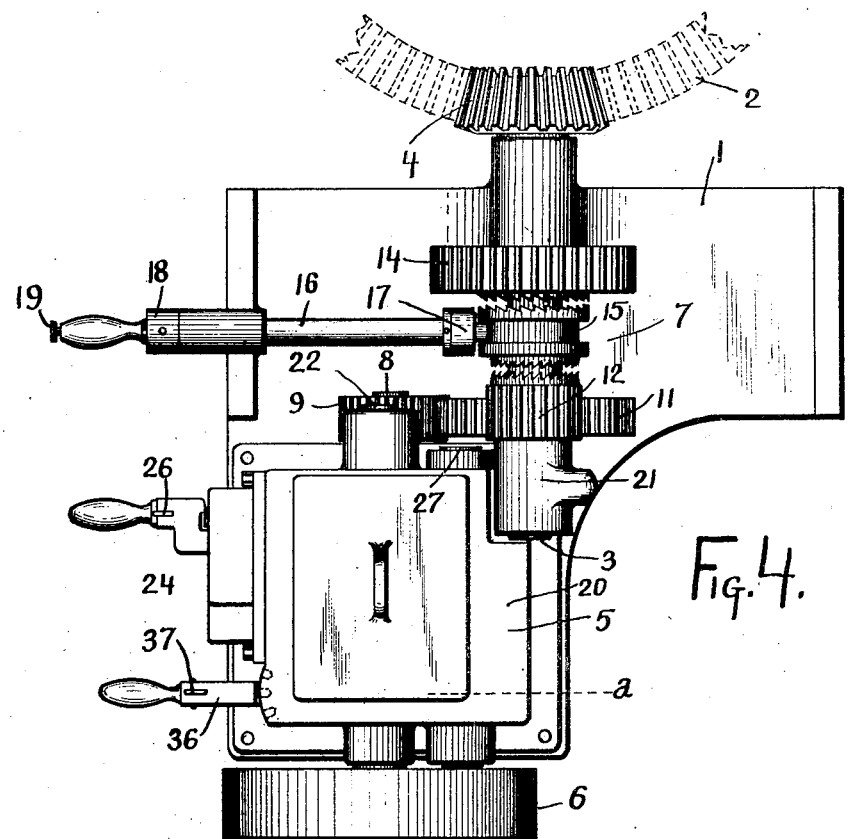
Figure 5:
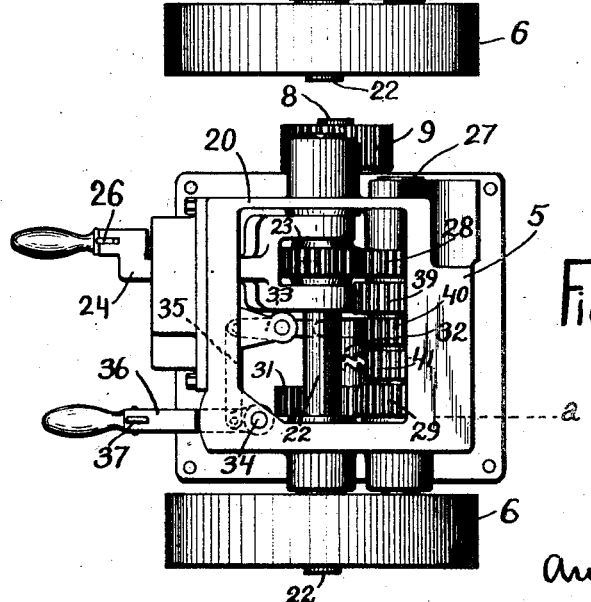

Figure 1 is a side elevation of a composite speed-changer embodying my invention; Fig. 2, a vertical section of the primary speed-changer in the plane of line *a* of Figs. 1, 4, and 5; Fig. 3, an end elevation of the secondary speed-changer, the primary speed-changer being omitted; Fig. 4, a plan of the composite speed-changer; Fig. 5, a plan of the primary speed-changer with the cover of its casing removed, and Fig. 6 a diagrammatic plan of the main motion parts involved in the composite system.

In the drawings, 1 indicates a bed-plate which is to be of a form adapting it for attachment to the machine in connection with which the composite speed-changer is to be employed, the bed-plate in the present instance being illustrated as a flat plate with end flanges; 2, a portion of a bevel-gear typifying the machine part to which selective speeds are to be transmitted; 3, the final shaft of the secondary speed-changer, the same being journaled in bearings supported by the bed-plate; 4, a bevel-pinion on this final shaft gearing with the wheel 2 and typifying the final delivery of rotary motion from the secondary speed-changer to the machine to be driven; 5, the primary speed-changer considered as a whole; 6, the prime motion-pulley of the primary speed-changer, this pulley representing the constant speed initial element of the composite system; 7, the secondary speed-changer considered as a whole; 8, the final shaft of the primary speed-changer, being the shaft by which the primary speed-changer delivers to the secondary speed-changer the selective speed as controlled by the primary speed-changer; 9, a pinion fast on the shaft 8; 10, a shaft parallel with shaft 3 and constituting the countershaft of the secondary speed-changer; 11, a gear fast on this counter-shaft and driven by pinion 9; 12, a clutch-faced pinion loose on shaft 3 and driven by gear 11 of the counter-shaft; 13, a pinion fast on the counter-shaft; 14, a clutch-faced gear loose on shaft 3 and driven by pinion 13; 15, a clutch splined on shaft 3 and adapted to clutch gears 12 and 14 alternatively to shaft 3; 16, a rock-shaft mounted in the bed-plate at right angles to the axis of shaft 3; 17, an arm fast on shaft 16 and engaging secondary clutch 15; 18, a hand-lever fast on shaft 16, and 19 a detent carried by hand-lever 18 and adapted to lock that lever in either of three selective positions corresponding with the neutral position or the selective clutching positions of clutch 15.

Figure 6:
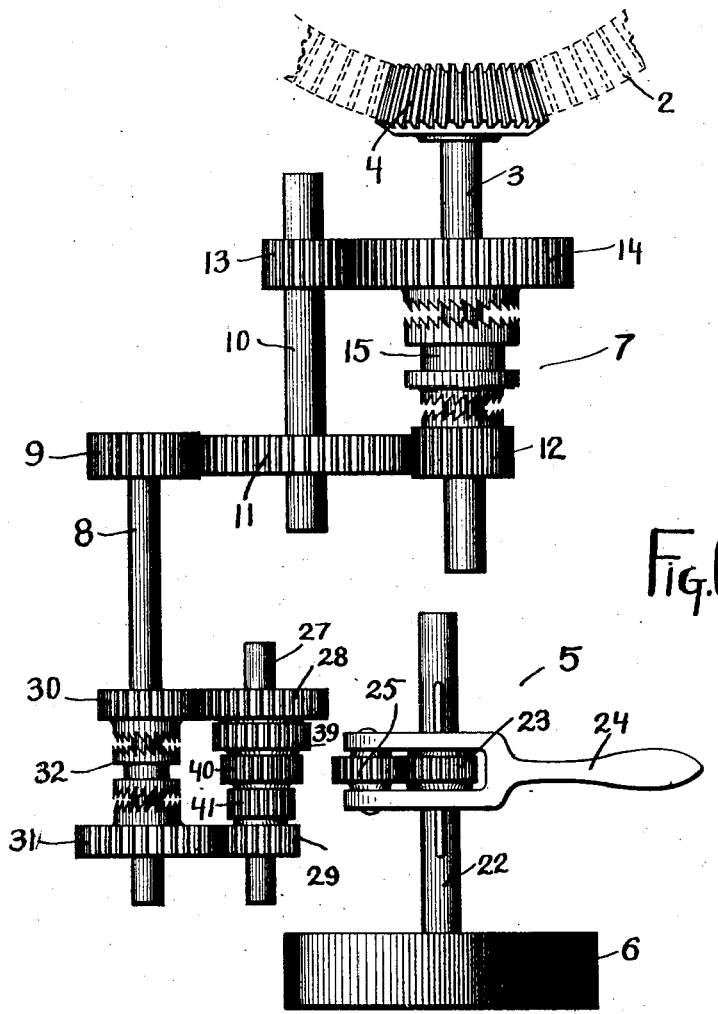

Give consideration for the present to Fig. 6 and assume for the instant that pinion 9 turns at constant rate—in other words, that there is no primary speed-changer. With pinion 12 engaged by clutch 15 motion at certain rate will be transmitted to final shaft 3, while with gear 14 engaged by the clutch the motion transmitted to final shaft 3 will be at very much lower rate of speed. If, however, pinion 9 turns at selective rate as controlled by the primary speed-changer, then the range of variable speeds resulting from the primary speed-changer becomes increased by reason of the employment of the secondary speed-changer.

The gearing between shafts 8 and 3 is to be specially proportioned to suit the given special situation, and so, also, is the form of the bed-plate which is to connect the general device to the machine to be driven. In other words, having a given machine for which the primary speed-changer is not adequate and for which a given secondary speed-changer will not make the system adequate, the gearing of the secondary speed-changer is to be reproportioned to suit the case and bring about a proper ultimate range of proper speeds for the final shaft 3 and the machine driven thereby. This special proportioning of the gears of the secondary speed-changer may possibly involve a special sizing of all of the gears between shafts 8 and 3, while in other and many cases a change in the size of pinion 9 may bring about the desired result.

Proceeding with the drawings, 20 indicates the casing of the primary speed-changer, and 21 a bearing secured to this casing and serving for the final shaft 3 of the secondary speed-changer.

The primary speed-changer 5 may for the present be viewed as an unvarying structure, the variations in general structure being embodied in the secondary speed-changer. The primary speed-changer is secured to the bed-plate which supports the secondary speed-changer, and the bearing 21 of the secondary speed-changer finds its direct support on the casing of the primary speed-changer, the form or dimensions of this bearing varying more or less to suit the conditions bringing about selective proportionings for the secondary speed-changer. This bearing may be viewed as the variable fixed element of union between the primary and secondary systems.

Proceeding with the drawings, 22 indicates the initial shaft of the primary speed-changer journaled in the casing 20 and having fast on it the prime pulley 6; 23, a pinion splined on this shaft; 24, a tumbling-lever straddling this pinion and fitted to slide and rock on its shaft; 25, a tumbling-pinion carried by the tumbling-lever and gearing with pinion 23; 26, a detent carried by the tumbling-lever, which is a hand-lever and adapted to lock the tumbling-lever in various positions; 27, a shaft journaled in the casing of the primary speed-changer parallel with initial shaft 22 and hereinafter termed the "cone-shaft;" 28, a gear fast on the cone-shaft; 29, a second gear fast on the cone-shaft; 30, a clutch-faced pinion loose on shaft 8 and engaging gear 28; 31, a clutch-faced gear loose on shaft 8 and engaging gear 29; 32, a double-faced clutch splined on shaft 8 and adapted to clutch gears 30 and 31 alternatively to that shaft; 33, an arm pivoted in the casing 20 and engaging the primary clutch 32; 34, a vertical rock-shaft pivoted in casing 20; 35, a link connecting an arm on shaft 34 with the clutch-arm 33; 36, the primary clutch-lever, which is a hand-lever, fast on shaft 34; 37, a detent carried by this clutch-lever and adapted to lock primary clutch 32 in either clutching position or in neutral position; 38, the arm before referred to as being on shaft 34 for connection with link 35, and 39, 40, and 41 a series of dissimilar-sized gears fast on cone-shaft 27.

By shifting tumbler 24 the pinion 25 can be brought into engagement with either of gears 28, 39, 40, or 41, whereby either of four speeds may be imparted to cone-shaft 27. The speed of the cone-shaft, whatever it may be adjusted for, may be imparted to shaft 8 under either of the two modifying conditions controlled by the clutch 32. It thus follows that with initial shaft 22 turning at a constant rate any selected one of eight different speeds may be imparted to shaft 8. The proportioning of the gearing of the primary speed-changer may be such as to bring about the most desirable range and proportioning of speeds for the shaft 8 to suit the most general conditions, it being understood, of course, that the number of gears on the cone-shaft may be increased, as desired. Having thus a certain number of well-proportioned selective speeds for the final shaft 8 of the primary speed-changer and having two changes available in the secondary speed-changer, sixteen different speeds are at command, the entire system well lending itself to a well-organized composite range of speeds suiting varying special conditions, while retaining the advantage of a primary speed-changer adapted not only to the special conditions, but to general conditions.

I claim—

1. In a composite speed-changer, the combination, substantially as set forth, of a shaft, a pair of dissimilar-sized clutching-gears loose thereon, a clutch on said shaft adapted to lock either of said gears to the shaft, a second shaft parallel with the first-mentioned shaft, a pair of dissimilar-sized gears fast thereon and engaging said clutching-gears, a third shaft, a gear fast thereon engaging one of the gears on the second shaft, a pair of dissimilar-sized clutching-gears loose on the third shaft, a clutch on the third shaft adapted to lock thereto either of the gears thereon, a fourth shaft parallel with the third shaft, a pair of dissimilar gears fast thereon and engaging the clutching-gears on the third shaft, additional dissimilar-sized gears fast on the fourth shaft, a fifth shaft parallel with the fourth shaft, a gear splined thereon, a tumbling-lever mounted on the fifth shaft and carrying the gear thereon, and a gear carried by the tumbling-lever and engaging the gear splined on the fifth shaft and adapted to selectively engage gears on the fourth shaft.

2. In a composite speed-changer, the combination, substantially as set forth, of a secondary speed-changer adapted to impart selective speeds to a machine, a plate forming a part of said secondary speed-changer and adapted for attachment to the machine, a gear forming a part of said secondary speed-changer, a casing separably secured to said plate, a primary speed-changing mechanism in said casing, comprising a shaft, a gear fast on said shaft and engaging the first-mentioned gear, an initial shaft, and means for imparting rotation to the last-mentioned shaft.

AUGUSTUS WOOD.

Witnesses:
  SAM D. FITTON,
  M. S. BELDEN.